(12) United States Patent
Blackall et al.

(10) Patent No.: US 8,552,336 B2
(45) Date of Patent: Oct. 8, 2013

(54) MICRO MATRIX DATA MARKING (75) Inventors: Eric Blackall, Richardson, TX (US); Ross Teggatz, McKinney, TX (US)

(73) Assignee: Triune IP LLC, Richardson, TX (US)

( * ) Notice: Subject to any disclaimer, the term of this patent is extended or adjusted under 35 U.S.C. 154(b) by 772 days.

(21) Appl. No.: 12/646,509

(22) Filed: Dec. 23, 2009

(65) Prior Publication Data

US 2010/0155380 A1 Jun. 24, 2010

Related U.S. Application Data (60) Provisional application No. 61/140,608, filed on Dec. 23, 2008.

(51) Int. Cl.
*B23K 26/00* (2006.01)
*B23K 26/04* (2006.01)

(52) U.S. Cl.
USPC ............ 219/121.6; 219/121.62; 219/121.69

(58) Field of Classification Search
USPC ............ 219/121.6, 121.61, 121.65, 121.62, 219/121.69, 121.77; 235/494, 495; 347/171–173
See application file for complete search history.

(56) References Cited

U.S. PATENT DOCUMENTS

| | | | |
|---|---|---|---|
| 5,324,923 A * | 6/1994 | Cymbalski et al. | 235/454 |
| 5,742,036 A * | 4/1998 | Schramm et al. | 235/449 |
| 7,005,603 B2 * | 2/2006 | Addington et al. | 219/121.69 |
| 7,204,419 B2 * | 4/2007 | Lizotte et al. | 235/462.01 |
| 2003/0224256 A1* | 12/2003 | Endo et al. | 430/9 |
| 2006/0108410 A1* | 5/2006 | Mattern | 235/375 |
| 2006/0174531 A1* | 8/2006 | Lizotte et al. | 42/1.01 |
| 2007/0038464 A1* | 2/2007 | Sato et al. | 705/1 |
| 2007/0041868 A1* | 2/2007 | Seto et al. | 422/56 |
| 2007/0278383 A1* | 12/2007 | Noguchi et al. | 250/205 |
| 2008/0073438 A1* | 3/2008 | Gu et al. | 235/494 |
| 2008/0101704 A1* | 5/2008 | Long | 382/205 |
| 2008/0106415 A1* | 5/2008 | Sellew et al. | 340/572.1 |
| 2008/0208236 A1* | 8/2008 | Hobbs et al. | 606/186 |
| 2008/0304525 A1* | 12/2008 | Kupisiewicz et al. | 372/30 |
| 2009/0070273 A1* | 3/2009 | Moryto | 705/80 |
| 2009/0188970 A1* | 7/2009 | Gouelibo et al. | 235/375 |
| 2010/0051829 A1* | 3/2010 | Nishioka | 250/492.2 |
| 2010/0055423 A1* | 3/2010 | Chretien et al. | 428/209 |

* cited by examiner

*Primary Examiner* — Hsien Ming Lee
(74) *Attorney, Agent, or Firm* — Hovey Williams LLP (57) ABSTRACT

The invention provides methods and systems for the application and reading of micro markings for coding of information for placement on the surfaces of individual very small devices. In preferred embodiments, a two dimensional micro matrix of markings or dots is realized on a scale of a 25 um cell size and smaller.

33 Claims, 4 Drawing Sheets

MICRO MATRIX DATA MARKING

PRIORITY ENTITLEMENT

This application is entitled to priority based on Provisional Patent Application Ser. No. 61/140,608 filed on Dec. 23, 2008, which is incorporated herein for all purposes by this reference. This application and the Provisional Patent Application have at least one common inventor.

TECHNICAL FIELD

The invention relates to marking objects with data such as part identification or serialization data. More particularly, the invention relates to micro markings, and micro marking and reading systems and methods for providing and using micrometer scale encoded data on manufactured goods and other articles.

BACKGROUND OF THE INVENTION

Commercial product marking standards exist in industries such as automotive, defense, medical, and electronics in applications where traceability is considered desirable. These standards are part of endeavors to ensure that traceable identifying marks are suitable for process control in the relevant applications. Examples of marking systems include data matrix codes such as Department of Defense Standard Practice Identification Marking (MIL-STD-130M), Data Matrix ECC200, MicroPDF417, and EIA802. These and possibly other marking conventions provide message format and syntax rules useful for two-dimensional encoding and marking at a relatively small scale. For example, technology known in the art is capable of making and reading markings with a single cell as small as about 191 µm on a side. Data matrixes made up of individual cells are somewhat larger, depending upon the number of cells used in the particular matrix coding scheme. Using the ECC200 format, for example, a data matrix capable of encoding 6 numeric characters includes 10 rows of cells in 10 columns, with a 191 µm cell size, would provide a total matrix area footprint of approximately 1910 µm by 1910 µm. Efforts to reduce the area required for matrix data marking are faced with several technical challenges. The markings must be permanent, reliably readable in a field environment, and should ideally include measures to reduce the potential for mismarking and/or misreading. Additionally, in some applications, such as implantable medical devices, the markings must be biocompatible, resistant to deterioration in a biological/chemical environment, and must not cause damage to surrounding biological materials.

Thus, the present state of the art presents problems in terms not only of matrix data marking size, but also other physical characteristics. Due to these and other problems and potential problems with the current state of the art, improved micro matrix data marking and reading apparatus, systems, and methods would be useful and advantageous in the arts.

SUMMARY OF THE INVENTION

In carrying out the principles of the present invention, in accordance with preferred embodiments, the invention provides advances in the arts with novel methods and apparatus directed to providing systems and methods for applying a micro matrix marking on an object by making discernable change to a physical property of a portion of the object's surface and reading the micro matrix marking using a machine reader.

According to one aspect of the invention, examples of preferred embodiments include steps for making micro matrix markings on an object by ablating the surface of the object using a laser.

According to another aspect of the invention, examples of preferred embodiments include steps for making micro matrix markings on an object by discoloring the surface of the object using a laser.

According to still another aspect of the invention, examples of preferred embodiments include steps for making micro matrix markings on an object by altering the surface of the object using heat.

According to another aspect of the invention, examples of preferred embodiments include steps for making micro matrix markings on an object by altering the surface of the object using a chemical etch.

According to yet another aspect of the invention, examples of preferred embodiments include steps for making micro matrix markings on an object by altering the electrical charge surface of the object.

According to still another aspect of the invention, examples of preferred embodiments include steps for making micro matrix markings on an object by altering the magnetic properties of the surface of the object. The marking apparatus may further comprise a controlled magnetic field applicator.

According to another aspect of the invention, examples of preferred embodiments include steps for making micro matrix markings on an object by applying material to a portion of the surface of the object whereby a discernable alteration of the magnetic field on the surface is made.

According to yet another aspect of the invention, examples of preferred embodiments include steps for making micro matrix markings on an object by applying material to a portion of the surface of the object whereby a discernable alteration of the optical properties of the surface is made.

According to another aspect of the invention, examples of preferred embodiments include steps for making micro matrix markings on an object by applying material to a portion of the surface of the object whereby a discernable alteration of the color of the surface is made.

According to still another aspect of the invention, examples of preferred embodiments include steps for making micro matrix markings on an object by applying material to a portion of the surface of the object whereby a discernable alteration of the reflectivity of the surface is made.

According to yet another aspect of the invention, examples of preferred embodiments include steps for making micro matrix markings on an object by applying material to a portion of the surface of the object whereby a discernable alteration of the texture of the surface is made.

According to another aspect of the invention, in preferred embodiments, the method steps include applying a micro matrix marking by altering the surface of an object using a laser such that the features of the micro matrix marking have a cell size within the range of about 5 µm to 25 µm.

According to other aspects of the invention, examples of preferred embodiments include reading steps using one or more optical, waveguide, X-ray, sonic, chemical, biological, or radio frequency reading means. The step of reading of the micro matrix pattern uses a reader adapted to sonically discern the micro matrix pattern.

According to further aspects of the invention, the systems and methods may be used for micro marking implantable medical devices, electronics, mechanical devices, medication, and the like.

According to still another aspect of the invention, preferred embodiments include examples of a micro matrix data marking and reading system. The system includes marking apparatus for forming micro matrix cells on the surface of an object and a reader for reading encoded micro matrix data cells formed by the marking apparatus. A handler is used for manipulating the object for marking and reading.

According to another aspect of the invention, examples of preferred embodiments have laser apparatus which includes a fiber laser.

According to another aspect of the invention, examples of preferred embodiments employ laser apparatus which includes a Ytterbium laser.

According to another aspect of the invention, examples of preferred embodiments include laser apparatus having a UV laser.

The invention has advantages including but not limited to one or more of the following, improved micro matrix data marking clarity, improved micro matrix data marking reading capabilities, reduced micro matrix marking size, and increased data marking capacity for a given area. These and other advantageous features and benefits of the present invention can be understood by one of ordinary skill in the arts upon careful consideration of the detailed description of representative embodiments of the invention in connection with the accompanying drawings.

BRIEF DESCRIPTION OF THE DRAWINGS

The present invention will be more clearly understood from consideration of the following detailed description and drawings in which.

References in the detailed description correspond to like references in the various drawings unless otherwise noted. Descriptive and directional terms used in the written description such as right, left, back, top, bottom, upper, side, et cetera, refer to the drawings themselves as laid out on the paper and not to physical limitations of the invention unless specifically noted. The drawings are not to scale, and some features of embodiments shown and discussed are simplified or amplified for illustrating principles and features, as well as anticipated and unanticipated advantages of the invention.

DESCRIPTION OF PREFERRED EMBODIMENTS

Micro matrix data markings for objects, for example, very small objects such as implantable screws and other components are reduced in size beyond existing standards as described. Reduction in micro matrix marking cell size in turn leads to reduced matrix size, increased data density, or both. While the making and using of various exemplary embodiments of the invention are discussed herein, it should be appreciated that the present invention provides inventive concepts which can be embodied in a wide variety of specific contexts. It should be understood that the invention may be practiced with various manufactured products and physical articles having markable surfaces, such as for example, microelectronic circuits, mechanical parts, natural objects, projectiles, medical devices, and medication, without altering the principles of the invention. For purposes of clarity, detailed descriptions of functions, components, and systems familiar to those skilled in the applicable arts are not included. In general, the invention provides micro marking and reading capabilities useful in a variety of applications and systems.

For the purpose of illustrating the practice and broad applicability of the invention, a particular example of a preferred embodiment selected from the medical field is shown and described. Medical implant applications are especially challenging because marking codes used on components implanted in the human body must meet stringent requirements regarding quality and reliability. Implantable medical device markings require biocompatibility and long lifecycles despite constant contact with the fluids and tissues within the human body. Additionally, application of permanent marks to advanced materials used in the construction of implantable components can be challenging. Biocompatible markings on implantable devices must be harmonious with living tissues and systems, non-toxic, and must not stimulate immunological rejection. For a material to be biocompatible, adverse reactions at the blood- and/or tissue-to-material interface must be minimal. Resistance to biodegeneration must also be high. This requires an implanted material to interact, insofar as possible, in the same manner as a natural material would in the presence of blood and tissue. In addition, the material must not be carcinogenic, immunogenic, antileukotactic or mutagenic. The material must resist degradation or corrosion in the biological environment that would result in loss of physical and mechanical properties. There are many factors which influence implant biocompatibility such as implant size, shape, material composition, surface wettability, texture, and electrical charge. Implantable materials all possess inherent morphological, chemical, and electrical surface qualities, which may elicit reactive responses from the surrounding biological environment. Thus, chemically or mechanically applied marks, tags, or labels can often be incompatible with materials and designs of small implantable medical devices. The inventors' experience and study of the art have led to the recognition that physical markings formed on the surface of a device are well-suited for implantable medical device applications. They do not add any composite material, such as inks, solvents, and the like when applied, thus minimizing biocompatibility issues. In an example of a preferred embodiment, laser marking systems may be used to mark surfaces and provide precise, high quality, permanent marks suitable for use on advanced materials. These and other qualities make methods and systems for forming micro markings by altering the molecular structure of a portion of a surface in general, and laser marking systems and methods in particular, suitable for implantable medical technology. Those skilled in the arts will appreciate that the exemplary micro marking approach shown and described may be used in various other applications as well. Additionally, in some embodiments, material may be added to the surface of the object to be marked.

Figure 1:
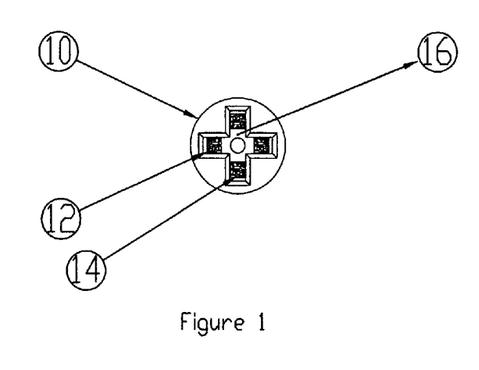
FIG. 1 is a top view of an example of an object bearing micro matrix markings according to preferred embodiments of the invention.

Referring primarily to FIG. 1, an example of a preferred embodiment of micro marking is shown on a metal screw. An implantable screw 10, such as a type used in cranio-maxialfacial surgery is depicted in a top view. The micro matrix pattern 12 in this example has a cell 14 size of approximately 25 µm. The micro matrix pattern 12 illustrated in this example has fourteen columns of cells 14 arranged in fourteen rows. Thus, the micro matrix pattern 12 is implemented in an area 350 μm by 350 μm. The micro matrix pattern 12 in this exemplary embodiment preferably provides sufficient data capacity for the encoding of twenty-four numeric characters, or ten alpha-numeric characters. As shown, multiple copies of the micro matrix pattern 12, in this case four, may preferably be included on the surface of the marked object. In this case, four planar surfaces of the screw slots 16 are used. Redundant micro markings are preferred where practical in order to provide a level of assurance that errors, such as might arise from a misapplied, damaged, obscured, or misread micro marking may be reduced or avoided.

Preferably in this exemplary embodiment, laser apparatus is used to heat and ablate or discolor the surface at one or more selected locations on the object to be marked. A laser adapted for making cells of a suitable size is used, such as a fiber laser. In this example, a Ytterbium laser is used. The cells may be encoded in a micro matrix arrangement covering a square, rectangular, polygonal, (as shown in FIG. 1) or circular area. In this example, individual cells about 25 μm on a side are made adjacent to one another in fourteen rows and fourteen columns. The laser, and/or object to be marked, is preferably moved by increments to bring the laser to bear on each cell requiring laser heating in order to form a data matrix. Some of the cells within the matrix are left blank; others are thoroughly ablated or discolored to form a cell surface discernibly different from un-altered cells and the remainder of the surface of the object to which the micro matrix pattern is applied. Preferably, the cells are formed using as few passes of the laser as practical. Depending upon the handling equipment used, the lasers may be moved over a stationary object, or the markable object may be moved in relation to one or more stationary lasers. Preferably, for micro markings having smaller cell sizes, with features less than 25 μm for example, an ultraviolet (UV) laser is used. It is believed that a cell size on the order of about 5 μm may be obtained by using a UV laser for marking, although care must be taken to avoid damage to the marked object, and to the micro marks themselves from the generation of excessive heat. The smaller cell sizes may be used to reduce the marking footprint, increase encoded data content, or both. Potentially, a two-dimensional matrix representing binary information can fit more than one thousand items of numeric code in a 480 μm×480 μm area. Thus, the application of a two-dimensional micro-scale binary pattern provides significant advantages for the encoding of data on extremely small areas. In some cases, depending upon the surface material and laser, discernable colors may be applied to form cells having a range of values, red, green, and blue, for example, or variations and/or combinations of red, green, and blue, enabling the storage of additional bits of data compared to a bi-tonal matrix.

Figure 2:
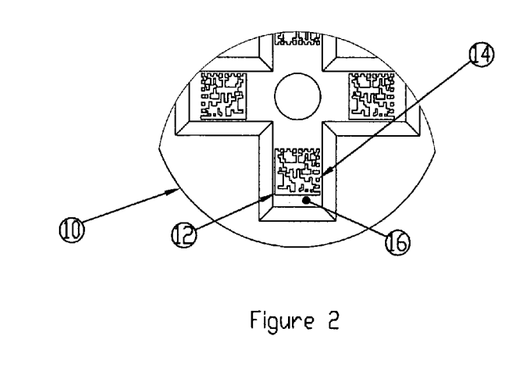
FIG. 2 is close-up top view of a portion of the marked object shown in FIG. 1, showing a micro matrix marking and readout according to preferred embodiments of the invention.

Preferably, after the two-dimensional micro matrix pattern has been marked on the object, the micro matrix pattern is read by a reader in order to verify that the intended code has been written, and that the code is readable. This is a preferred step during the marking process to validate the overall quality of the marking process. Some of the factors that determine the quality of a micro matrix marking include contrast, color, geometric accuracy, e.g. well-defined, properly placed, and aligned cells, dimensional accuracy, placement of matrix alignment marks, and preferably the placement of redundant micro markings. FIG. 2 shows a close-up partial view of the exemplary implementation introduced with respect to FIG. 1. The micro matrix pattern 12 is preferably read by positioning it in relation to a suitable reading apparatus configured for reading micro matrix pattern codes. In this example of a preferred embodiment of the invention, a micro matrix pattern 12 inscribed on a screw head is shown with a readout 20 showing data relevant to the matrix 12. Viewed with a suitable reader, the cells of the matrix are discernable and may be compared with encoded information for mapping the matrix cell combinations to alphanumeric or other data formats.

Figure 3:
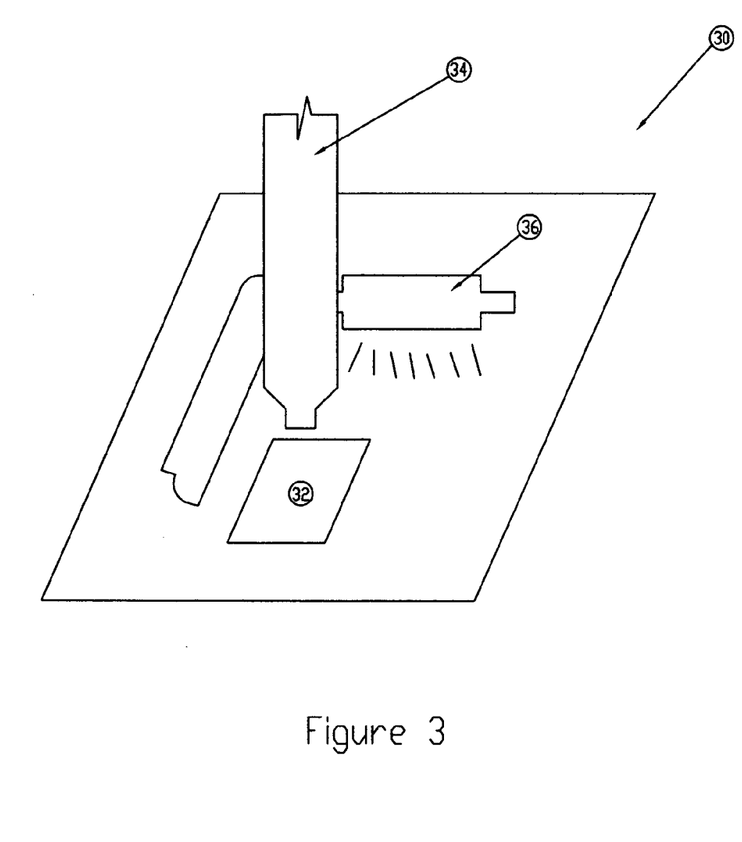
FIG. 3 is a top perspective side view of an example of reader apparatus for reading micro matrix markings according to preferred embodiments of the invention.

An example of a micro matrix reader 30 suitable for use with the micro matrix marking patterns 12 is depicted in FIG. 3. The reader 30 includes a part alignment fixture 32 for holding micro marked objects for reading. A reader module 34, in this example composed of optical elements, is configured for providing sufficient magnification for discerning cells of a particular magnitude, e.g., in this example 25 μm. The reader 30 is adaptable for the presentation, reading, and decoding of two-dimensional micro matrix data from a variety of marked objects. In the case of relatively flat marked objects, such as semiconductor devices or medication, the orientation of the two-dimensional micro matrixes may be facilitated by a planar part alignment fixture 32. In the case of marked objects having more complex shapes, such as screws, a part alignment fixture is preferably configured to orient the marked objects so that their two-dimensional micro matrixes are properly presented to the reader module. Mechanical, chemical, magnetic or other adaptations for holding marked objects may be used. A light module 36 is preferably used to enhance the lighting on the marked objects, specifically the matrixes, presented to the reader 30. The brightness, wavelengths, (e.g., visible, ultraviolet, infrared, or x-ray), number of light sources, angles, and other lighting characteristics are preferably controlled to enhance readability. In general, readers require gauging tools for controlled lighting, reflectance calibration for presentation control, hardware/software assisted focus optimization, and motor control for x-y-z-axis scanning and focusing capabilities for the micro matrix marking geometry. For readers in general, and for the optical reader in this example in particular, there are several technical considerations for controlling the reading environment, such as the planarity of the surface upon which the micro marking is to be read, the effects of shading on the micro level, the distance and height of any device surface contours in close proximity to the micro marking, intensity and angle of luminance for ambient light and reader lighting, presentation of micro markings to the reader, field of view, depth of focus, and data transfer capability.

Figure 4:
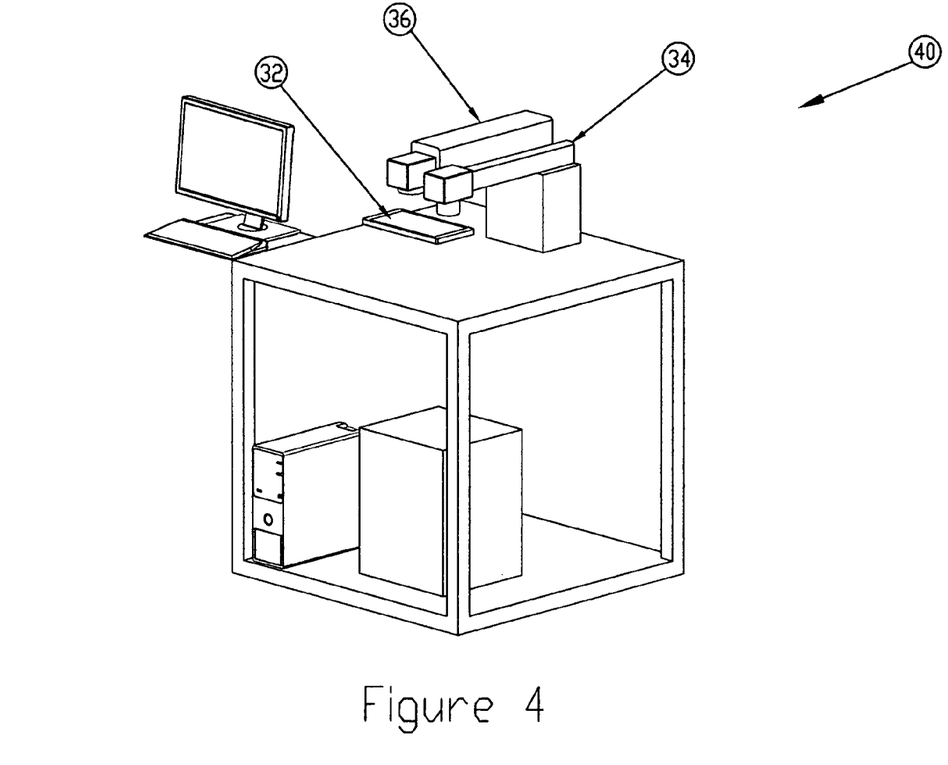
FIG. 4 is a top front perspective view of an example of a micro matrix marking and reading system according to preferred embodiments of the invention.

FIG. 4 is a simplified representation of a system for reading micro markings. An optical reader 40 may use a series of optical elements in order to discern the presence of a micro matrix pattern, discern the cells of the matrix, and decode the data recorded in the matrix. Preferably, locator marks may be used on the surface of the marked object in order to direct the reader to the micro matrix pattern. For example, locator marks may be dispersed on a surface at intervals, the intervals decreasing or increasing to indicate distance and/or direction to the micro matrix pattern. Alternatively, coordinate marks, arrows, or the like, relatively large compared to the micro markings, may be used to provide a few bits of data designed to direct the reader, e.g., a grid location of the micro marking (s). Thus, an automated reader, or an operator, may be directed to the micro mark location(s) by relatively large, and preferably more cheaply implemented, locator marks. The locator marks may be implemented using marking methods similar or dissimilar to that used for the particular micro marks. For example, in an implementation using laser-ablated micro marks on a relatively small surface, it may be advantageous from a manufacturing standpoint to use locator marks also made by laser ablation. On a relatively large surface, it may be a more advantageous alternative to use chemically or mechanically etched locator marks. It should be recognized that combinations of locator marks may also be used, e.g., a painted area for use by a human user in positioning the reader, in combination with a machine-readable locator mark for directing the reader to the precise micro mark location. In preferred embodiments, the reader 40 includes positioning apparatus such as stepper motors configured on a scale with the micro markings to be read. In the alternative, or in addition to optical elements, the reader 40 may use other technology for detecting micro markings and reading the micro matrix patterns. For example, waveguide, RF, x-ray, sonic, chemical, biological, or other instrumentation may be used for discerning the physical properties and/or molecular characteristics of micro markings on a marked surface.

The part alignment fixture is preferably configured to position the marking surface of the object, in this case screws, at the focal plane of the laser marking beam to one one-thousandth of an inch. The part alignment fixture is configured to provide suitable minimum spacing between parts, and preferably maximum alignment fixture dimensions are selected for carrying multiple parts in compatibility with the space available. Sufficient rotational orientation is provided as necessary in order to present the appropriate surface, in this case screw heads, to the marking and reading apparatus. Sufficiently accurate x-y location tolerance, in this case about five one-thousandths of an inch, must also provided, as well as z-axis marking surface location tolerance, e.g., one one-thousandth of an inch, in order to ensure proper positioning relative to the laser for proper focusing. The depth-of-field of the laser must be taken into consideration when implementing the part alignment fixtures. The depth-of-field is largely determinative of the required z-axis positioning of the surface to be marked and the variation in surface heights that can be accommodated without raising/lowering the laser head. The laser beam may be conceptualized as two cones of light touching point-to-point. The focal point of the beam, the point at which the two cones touch, is a fixed distance below the flat-field lens throughout the marking area. A two-dimensional focal plane is preferably defined by the focal point as the laser beam is moved on the surface of the item to be marked. If the surface to be marked were to be raised or lowered above or below the focal plane, the beam diameter would increase resulting in a larger marking area and reduced power density, i.e. diminished marking power. Excessive departure from the focal plane along the z-axis would produce unacceptable marking results.

The laser marking head is preferably combined in an assembly with a reader, in this case an optical vision camera positionable over the alignment fixture with a programmable motion system using stepping motors and/or the like for controlling positioning. In preferred implementations, the marking cycle commences with the camera positioned directly above the alignment fixture securing a screw to be marked. The camera verifies the location and rotational orientation of the screw and communicates the information to the laser controller. The laser marking head is then positioned such that the laser is directly over the target area on the surface of the screw and marks the surface of the screw as directed by a marking program, alternately ablating and switching off as required for each cell of the selected matrix code. A marking program utilized for controlling the apparatus may include instructions to repeat a particular mark at various locations on the screw, and may also be configured to repeat markings on successive screws, or to implement unique markings on each screw, as in incrementing a numerical value for serialization markings, for example. Subsequently, the camera is preferably repositioned over the markings in order to verify the content and readability of the micro matrix markings in comparison with their expected values.

Those skilled in the applicable arts will perceive that the marking and reading system may readily be controlled using a suitably configured operator workstation and controls and related software and database. Suitable software may include part number database information and downloading capabilities as well as bar coding or matrix labeling capabilities for tracking and/or packaging of micro matrix marked parts, for example. With some materials, the act of laser marking a surface may produce release of vaporized particles. These particles are preferably removed from the vicinity to protect the laser beam delivery optics and reader from contamination. Suitable ducting and ventilation is preferably provided in order particulate matter from the marking area.

Preferably, in order to generate a high density code size with increased data capacity, a finer resolution UV laser may be used. Potentially, a cell size of about 5 μm-25 μm may be implemented enabling numeric data capacity in the 1000 character range. This implementation comes with greater risk of excessive heat conduction during the marking process, as heat from the laser could have detrimental effects on both the mark and object being marked. Melted materials could potentially splatter over the surface nearby, thus detracting the contrast and appearance of the mark. A heat-darkened zone outside the cell and kerfs may be created as well, potentially causing a loss of contrast and reducing readability. Thus, those skilled in the arts should appreciate that cooling measures are required in such implementations, such as the marking apparatus further comprising a refrigerant applicator. Also, fine particles can be released by laser ablation or other marking techniques, possibly requiring additional cleaning steps in the manufacturing and marking process to reduce or eliminate the presence of potentially damaging or obscuring particles. In the realm of slightly larger micro markings, 15 μm-25 μm, standard ytterbium lasers may be used. A YLP laser apparatus, for example, providing a pulsed output beam with average output power from 5 to 100 Watts and pulse width from 80 to 500 ns. Laser output is preferably provided by a beam collimator emitting a near-diffraction limited beam with a diameter from 2 nm to 15 mm and a center emission wavelength in the range of about 1060 to 1070 nm.

Due to the substantially reduced field of view of the small cell size of micro markings, a microscope is generally required to expand the image in order for an optical reader to discern the micro matrix pattern. Several light sources are preferably positioned to illuminate the target area where the micro-mark is present without creating lighting issues which could cause the inability to read the cells. The microscope is positioned between the target read-area and the optical reader. The microscope will enlarges the image so that the reader can discern the micro matrix pattern. The field of view in the x/y and z dimensions are limited to within the tight tolerance of approximately 3-5 mm in each direction. This is be achieved utilizing micro-stepping motors and the like along with optical focus and x-y alignment software and hardware.

Figure 5:
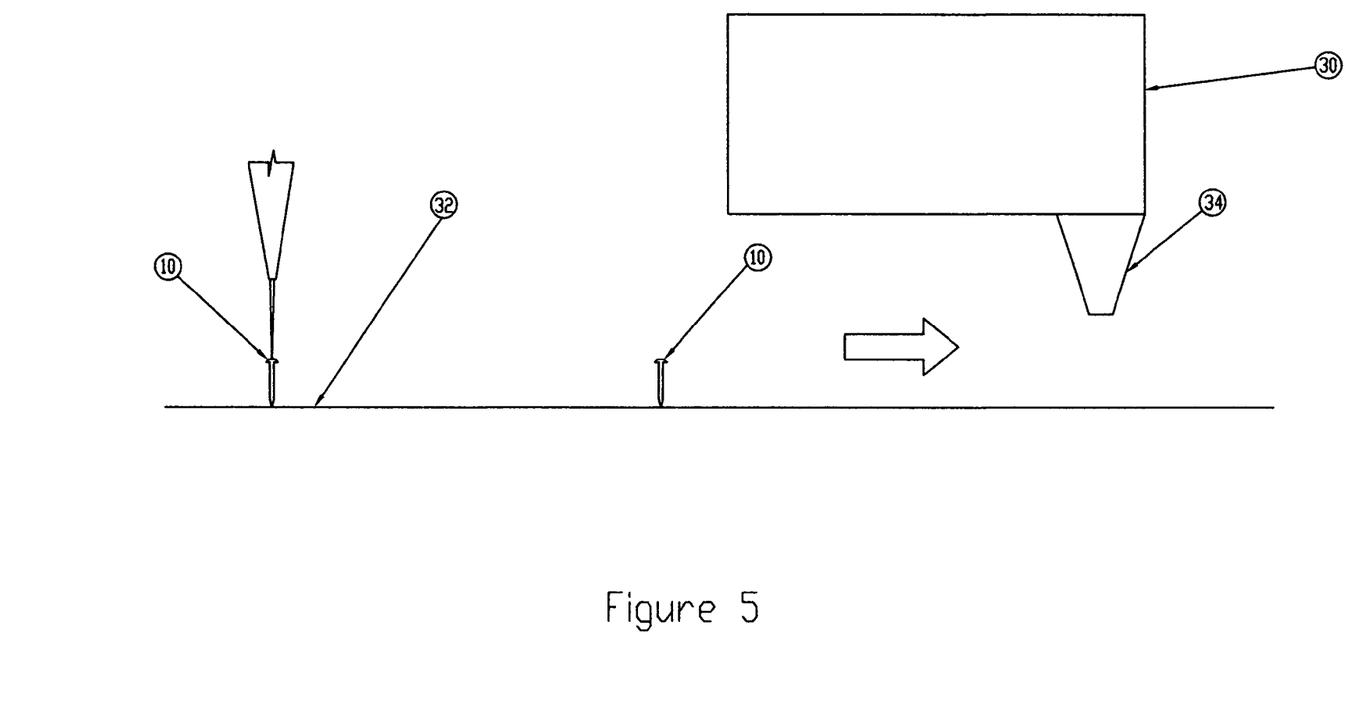
FIG. 5 is a simplified conceptual block diagram of micro matrix marking and reading systems and methods according to preferred embodiments of the invention.

FIG. 5 is a conceptual block diagram side view of a system for micro matrix marking with a laser and reader. The typical laser micro marking system preferably includes three major components. A laser, such as a fiber laser, for laser-scribing an image directly on the part alignment fixture. Optics are preferably used for laser beam-shaping, and for directional positioning, also called beam-steering. The laser light source is preferably amplified to produce an intense collimated beam of light at a specific wavelength. Flat field optics are used to focus the laser beam to a small, highly intense spot on the surface selected for marking. A positioning system is used to precisely scan the laser beam across the targeted marking surface in the x and y directions in order to produce the desired marking. The laser beam may be manipulated by use of high speed precision galvanometers to which two beam steering mirrors are mounted. A computer system is used to control the rotation of the mirrors to position the laser beam at the desired micro marking location. Object pick and place with optical alignment will preferably be accomplished using stepping motors and pneumatic control. Subsequent to the physical positioning of the object, optics are used for the alignment of the laser, as well as presenting the marked object for machine reading and verification of marking codes. Generally, automated handling apparatus is used to present marked objects for further processing such as additional inspections, cleaning, and packaging for delivery.

The methods and apparatus of the invention provide one or more advantages including but not limited to, micro markings capable of providing high data density on a small area, micro markings readable in more than one orientation, relatively low-contrast micro markings directly on a surface without requiring a label, built-in error-correction, traceability for inventory control or forensics, patent marking, fraud and counterfeit detection, increased automation efficiency, and improved record-keeping. While the invention has been described with reference to certain illustrative embodiments, those described herein are not intended to be construed in a limiting sense. For example, variations or combinations of steps or materials in the embodiments shown and described may be used in particular cases without departure from the invention. Various modifications and combinations of the illustrative embodiments as well as other advantages and embodiments of the invention will be apparent to persons skilled in the arts upon reference to the drawings, description, and claims.

We claim:

1. A method for marking an object with a micro marking, comprising the steps of: forming a bio-compatible micro matrix pattern on a surface of the object by changing at least one physical property of a portion of the surface of the object, wherein the changing of at least one physical property of a portion of the surface of the object does not adversely affect the bio-compatibility of the micro matrix pattern, and wherein said object is an implantable medical device; and subsequently, reading the bio-compatible micro matrix pattern using a reader adapted for discerning the bio-compatible micro matrix pattern.

2. The method for marking an object with a micro marking according to claim 1, wherein the step of forming a bio-compatible micro matrix pattern on a surface of the object further comprises ablating a portion of the surface of the object with a laser whereby a discernable alteration of a molecular structure of the surface is made.

3. The method for marking an object with a micro marking according to claim 1, wherein the step of forming a bio-compatible micro matrix pattern on a surface of the object further comprises heating a portion of the surface of the object whereby a discernable alteration of a molecular structure of the surface is made.

4. The method for marking an object with a micro marking according to claim 1, wherein the step of forming a bio-compatible micro matrix pattern on a surface of the object further comprises cooling a portion of the surface of the object whereby a discernable alteration of a molecular structure of the surface is made.

5. The method for marking an object with a micro marking according to claim 1, wherein the step of forming a bio-compatible micro matrix pattern on a surface of the object further comprises chemically etching a portion of the surface of the object whereby a discernable alteration of a molecular structure of the surface is made.

6. The method for marking an object with a micro marking according to claim 1, wherein the step of forming a bio-compatible micro matrix pattern on a surface of the object further comprises altering the electrical charge of a portion of the surface of the object whereby a discernable alteration of a molecular structure of the surface is made.

7. The method for marking an object with a micro marking according to claim 1, wherein the step of forming a bio-compatible micro matrix pattern on a surface of the object further comprises altering the magnetic field exhibited by a portion of the surface of the object whereby a discernable alteration of a molecular structure of the surface is made.

8. The method for marking an object with a micro marking according to claim 1, wherein the step of forming a bio-compatible micro matrix pattern on a surface of the object further comprises applying material to a portion of the surface of the object whereby a discernable alteration of the magnetic field on the surface is made.

9. The method for marking an object with a micro marking according to claim 1, wherein the step of forming a bio-compatible micro matrix pattern on a surface of the object further comprises applying material to a portion of the surface of the object whereby a discernable alteration of the optical properties of the surface is made.

10. The method for marking an object with a micro marking according to claim 1, wherein the step of forming a bio-compatible micro matrix pattern on a surface of the object further comprises applying material to a portion of the surface of the object whereby a discernable alteration of the color of the surface is made.

11. The method for marking an object with a micro marking according to claim 1, wherein the step of forming a bio-compatible micro matrix pattern on a surface of the object further comprises applying material to a portion of the surface of the object whereby a discernable alteration of the reflectivity of the surface is made.

12. The method for marking an object with a micro marking according to claim 1, wherein the step of forming a bio-compatible micro matrix pattern on a surface of the object further comprises applying material to a portion of the surface of the object whereby a discernable alteration of the texture of the surface is made.

13. The method for marking an object with a micro marking according to claim 1, wherein the step of forming a bio-compatible micro matrix pattern on a surface of the object further comprises applying material to a portion of the surface of the object whereby a discernable alteration of the biological activity on the surface is made.

14. The method for marking an object with a micro marking according to claim 1, wherein the step of forming a bio-compatible micro matrix pattern on a surface of the object further comprises forming a physical boundary on the surface, and applying material to a bounded portion of the surface of the object whereby a discernable alteration of the biological activity on the surface is made.

15. The method for marking an object with a micro marking according to claim 1, wherein the step of forming a bio-compatible micro matrix pattern on a surface of the object further comprises altering a molecular structure of a portion of the surface of the object thereby forming features of the bio-compatible micro matrix pattern having a cell size with a maximum dimension smaller than about 25 µm.

16. The method for marking an object with a micro marking according to claim 1, wherein the step of forming a bio-compatible micro matrix pattern on a surface of the object further comprises applying material to a portion of the surface of the object thereby forming features of the bio-compatible micro matrix pattern having a cell size with a maximum dimension smaller than about 25 µm.

17. The method for marking an object with a micro marking according to claim 1, wherein the step of forming a bio-compatible micro matrix pattern on a surface of the object further comprises altering a molecular structure of a portion of the surface of the object thereby forming features of the bio-compatible micro matrix pattern having a cell size with a maximum dimension smaller than about 15 µm.

18. The method for marking an object with a micro marking according to claim 1, wherein the step of forming a bio-compatible micro matrix pattern on a surface of the object further comprises applying material to a portion of the surface of the object thereby forming features of the bio-compatible micro matrix pattern having a cell size with a maximum dimension smaller than about 15 µm.

19. The method for marking an object with a micro marking according to claim 1, wherein the step of forming a bio-compatible micro matrix pattern on a surface of the object further comprises altering a molecular structure of a portion of the surface of the object thereby forming features of the bio-compatible micro matrix pattern having a cell size with a maximum dimension smaller than about 10 µm.

20. The method for marking an object with a micro marking according to claim 1, wherein the step of forming a bio-compatible micro matrix pattern on a surface of the object further comprises applying material to a portion of the surface of the object thereby forming features of the bio-compatible micro matrix pattern having a cell size with a maximum dimension smaller than about 10 µm.

21. The method for marking an object with a micro marking according to claim 1, wherein the step of forming a bio-compatible micro matrix pattern on a surface of the object further comprises altering a molecular structure of a portion of the surface of the object thereby forming features of the bio-compatible micro matrix pattern having a cell size within the range of about 5 µm to 25 µm.

22. The method for marking an object with a micro marking according to claim 1, wherein the step of forming a bio-compatible micro matrix pattern on a surface of the object further comprises applying material to a portion of the surface of the object thereby forming features of the bio-compatible micro matrix pattern having a cell size within the range of about 5 µm to 25 µm.

23. The method for marking an object with a micro marking according to claim 1 wherein the step of reading the bio-compatible micro matrix pattern further comprises using a reader adapted to optically discern the bio-compatible micro matrix pattern.

24. The method for marking an object with a micro marking according to claim 1 wherein the step of reading the bio-compatible micro matrix pattern further comprises using a waveguide reader adapted to discern the bio-compatible micro matrix pattern.

25. The method for marking an object with a micro marking according to claim 1 wherein the step of reading the bio-compatible micro matrix pattern further comprises using a radio frequency reader adapted to discern the bio-compatible micro matrix pattern.

26. The method for marking an object with a micro marking according to claim 1 wherein the step of reading the bio-compatible micro matrix pattern further comprises using an x-ray reader adapted to discern the bio-compatible micro matrix pattern.

27. The method for marking an object with a micro marking according to claim 1 wherein the step of reading the bio-compatible micro matrix pattern further comprises using a reader adapted to sonically discern the bio-compatible micro matrix pattern.

28. The method for marking an object with a micro marking according to claim 1 wherein the step of reading the bio-compatible micro matrix pattern further comprises using a reader adapted to chemically discern the bio-compatible micro matrix pattern.

29. The method for marking an object with a micro marking according to claim 1 wherein the step of reading the bio-compatible micro matrix pattern further comprises using a reader adapted to biologically discern the bio-compatible micro matrix pattern.

30. The method for marking an object with a micro marking according to claim 1 wherein the marked object further comprises an electronic device.

31. The method for marking an object with a micro marking according to claim 1 wherein the marked object further comprises a mechanical device.

32. The method for marking an object with a micro marking according to claim 1 wherein the marked object further comprises a munitions device.

33. The method for marking an object with a micro marking according to claim 1 wherein the marked object further comprises a projectile.

* * * * *